(12) United States Patent
Shirone

(10) Patent No.: US 11,135,693 B2
(45) Date of Patent: Oct. 5, 2021

(54) MACHINE TOOL SYSTEM

(71) Applicant: MAKINO MILLING MACHINE CO., LTD., Tokyo (JP)

(72) Inventor: Masahiro Shirone, Yamanashi (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 25 days.

(21) Appl. No.: 16/647,375

(22) PCT Filed: Sep. 15, 2017

(86) PCT No.: PCT/JP2017/033588
§ 371 (c)(1),
(2) Date: Mar. 13, 2020

(87) PCT Pub. No.: WO2019/053900
PCT Pub. Date: Mar. 21, 2019

(65) Prior Publication Data
US 2020/0230761 A1    Jul. 23, 2020

(51) Int. Cl.
*B23Q 3/155* (2006.01)
*B23Q 3/157* (2006.01)
*B23Q 7/04* (2006.01)
*B23Q 13/00* (2006.01)
*B23H 11/00* (2006.01)

(52) U.S. Cl.
CPC ...... *B23Q 3/15539* (2016.11); *B23Q 3/15713* (2013.01); *B23Q 7/04* (2013.01); *B23Q 13/00* (2013.01); *B23Q 7/046* (2013.01); *B23Q 2003/1558* (2013.01); *B23Q 2003/15532* (2016.11); *B23Q 2003/15537* (2016.11); *Y10T 483/165* (2015.01); *Y10T 483/17* (2015.01);
(Continued)

(58) Field of Classification Search
CPC .. Y10T 483/11; Y10T 483/115; Y10T 483/16; Y10T 483/165; Y10T 483/17; Y10T 483/1738; Y10T 483/175; Y10T 483/1845; Y10T 483/1855; B23Q 3/15539; B23Q 3/15573; B23Q 2003/15537; B23Q 2003/1558; B23Q 7/045; B23Q 7/046; B23Q 13/00
USPC ............. 483/2, 3, 14, 15, 16, 32, 37, 63, 64
See application file for complete search history.

(56) References Cited

U.S. PATENT DOCUMENTS 4,543,636 A * 9/1985 Noda .................. B23Q 3/15539
700/179
4,664,590 A * 5/1987 Maekawa ............ B23Q 7/1442
414/744.1
(Continued)

FOREIGN PATENT DOCUMENTS

DE         3614165 A1 * 10/1987 ............... B23Q 7/04
DE   102006024904 A1 * 11/2007 ....... G05B 19/40938
(Continued)

*Primary Examiner* — Erica E Cadugan
*Assistant Examiner* — Michael Vitale
(74) *Attorney, Agent, or Firm* — Morrison & Foerster LLP

(57) ABSTRACT

This machine tool system is provided with a tool holder adaptor that has a flange having formed therein: a hole part that contains a tool holder; and an engagement part that engages with a hand of a self-propelled robot, wherein when transporting the tool holder to a machine tool from a tool storage that contains a plurality of tool holder adaptors, the self-propelled robot grasps the tool holder adaptor to transport the tool.

3 Claims, 4 Drawing Sheets

(52) U.S. Cl.
CPC ...... *Y10T 483/175* (2015.01); *Y10T 483/1738* (2015.01); *Y10T 483/1855* (2015.01)

(56) References Cited

U.S. PATENT DOCUMENTS

| | | | | |
|---|---|---|---|---|
| 4,811,843 | A | * | 3/1989 | Stribiak .................. B23Q 13/00 134/201 |
| 4,858,302 | A | * | 8/1989 | Stribiak ............. B23Q 3/15536 483/3 |
| 4,922,603 | A | * | 5/1990 | Kosmowski ............. B23Q 1/38 483/56 |
| 5,846,036 | A | * | 12/1998 | Mizoguchi ............. B23Q 13/00 409/134 |
| 5,885,200 | A | | 3/1999 | Sugihara et al. |
| 5,945,009 | A | * | 8/1999 | Beck .................... B23H 11/003 219/69.11 |
| 8,912,466 | B2 | * | 12/2014 | Bobeck .................... B23H 7/26 219/138 |
| 2008/0040911 | A1 | * | 2/2008 | De Koning ...... G05B 19/41825 483/1 |
| 2015/0080197 | A1 | * | 3/2015 | Yang ...................... B23B 3/065 483/1 |
| 2017/0192415 | A1 | | 7/2017 | Grant, Jr. et al. |

FOREIGN PATENT DOCUMENTS

| | | | | |
|---|---|---|---|---|
| DE | 102013106427 | A1 | * 12/2014 | ........... B23Q 7/1426 |
| DE | 202018102658 | U1 | * 5/2018 | ........ B23Q 3/15566 |
| DE | 102018109744 | A1 | * 10/2019 | ........ B23Q 3/15526 |
| EP | 0319914 | A1 | * 6/1989 | ........ B23Q 3/15536 |
| JP | S55-70543 | A | 5/1980 | |
| JP | 55157440 | A | * 12/1980 | ........ B23Q 3/15506 |
| JP | S58-137539 | A | 8/1983 | |
| JP | S58-181537 | A | 10/1983 | |
| JP | S60-127959 | A | 7/1985 | |
| JP | 60242941 | A | * 12/1985 | ................ B25J 5/00 |
| JP | 61226241 | A | * 10/1986 | ........ B23Q 3/15713 |
| JP | 01115537 | A | * 5/1989 | ........ B23Q 3/15539 |
| JP | H5-23906 | B2 | 4/1993 | |
| JP | 2003-94292 | A | 4/2003 | |

* cited by examiner

MACHINE TOOL SYSTEM

CROSS-REFERENCE TO RELATED APPLICATIONS

This application is a U.S. national phase patent application of International Patent Application No. PCT/JP2017/033588 filed Sep. 15, 2017, which is hereby incorporated by reference in the present disclosure in its entirety.

FIELD OF THE DISCLOSURE

The present invention relates to a machine tool system constituted by a plurality of machine tools and a plurality of self-propelled robots.

BACKGROUND OF THE DISCLOSURE

Machine tools machine workpieces into predetermined shapes using tools. At this time, it is necessary to perform operations for attaching a workpiece to the machine tool, operations to attach a tool to a tool exchange device of the machine tool, and operations to unload the workpiece after machining is finished. At that time, production efficiency can be increased by performing attachment and unloading automatically, rather than manually, using robots or automated guided vehicles.

Patent Literature 1 discloses a production system which transports workpieces and tools, the system comprising a gantry loader having a hand storage area and several types of hands such as a workpiece hand and a tool hand, wherein the hand is exchanged depending on the target to be transported.

PATENT LITERATURE

[PTL 1] Japanese Examined Patent Publication (Kokoku) No. 05-23906

SUMMARY OF THE DISCLOSURE

When a workpiece is machined by a machine tool, attachment and unloading of the workpiece are performed. Furthermore, since the tool provided in the tool exchange device of the machine tool becomes worn or broken by the machining, it is necessary to unload the unneeded tool to the outside of the machine tool, and insert a new tool into the tool exchange device of the machine tool. Though such operations are automatically performed using a robot in order to increase production efficiency, it is necessary to adapt to shape differences between the workpiece and the tool.

In the case in which workpieces and tools are transported, there is a method of exchanging the hand in accordance with the object to be transported, as in Patent Literature 1. When exchanging the hand, a device for exchanging and exchanging time for exchanging are necessary.

The present invention has been completed in light of the circumstances described above, and aims to provide a machine tool system which can adapt to shape differences between workpieces and tools and which is constituted by a self-propelled robot which can efficiently perform transportation operations without requiring labor for exchanging the hand thereof.

The present invention provides a machine tool system for transporting tools and workpieces to a plurality of machine tools, the system comprising a tool holder for holding a tool, a self-propelled robot having a hand for engagement with a predetermined shape, a tool holder adapter having a hole for accommodating the tool holder and a flange having formed therein an engagement part for engagement with the hand, and a tool storage for storing a plurality of tool holder adapters for storing tool holders, wherein when a tool holder is transported from the tool storage to the machine tool, the self-propelled robot transports the tool by gripping the tool holder adapter.

As a result, even a self-propelled robot having a hand which is larger than a tool exchange groove formed in the tool holder and which cannot fit in the tool exchange groove can transport a tool holder from the tool storage to the tool magazine, which is in the tool exchange device of the machine tool.

The present invention is further configured wherein at least one of the plurality of machine tools has a pallet chuck which engages with a pallet, the system further comprises a pallet which engages with the pallet chuck, a workpiece adapter including an attachment part to which a workpiece can be attached and an engagement part which engages with the hand and which is formed between the pallet and the attachment part, and a workpiece storage in which a plurality of pallets to which workpieces are mounted are stored in a state in which the workpieces are attached to the attachment part, and when a workpiece is transported from the workpiece storage to the machine tool, the self-propelled robot transports the workpiece by gripping the workpiece adapter.

As a result, even a self-propelled robot having a hand which is smaller than a pallet exchange device groove formed in the pallet and which cannot fit in the pallet exchange device groove can transport a pallet from the workpiece storage to the pallet exchange device of the machine tool.

According to the present invention, since the tool holder adapter, the workpiece adapter, and the electrode holder can be gripped by hands having the same shape, tools, workpieces, and electrodes can be efficiently transported from storage to the machine tools with one type of self-propelled robot without exchanging the hand.

DETAILED DESCRIPTION OF THE DISCLOSURE

Figure 1:
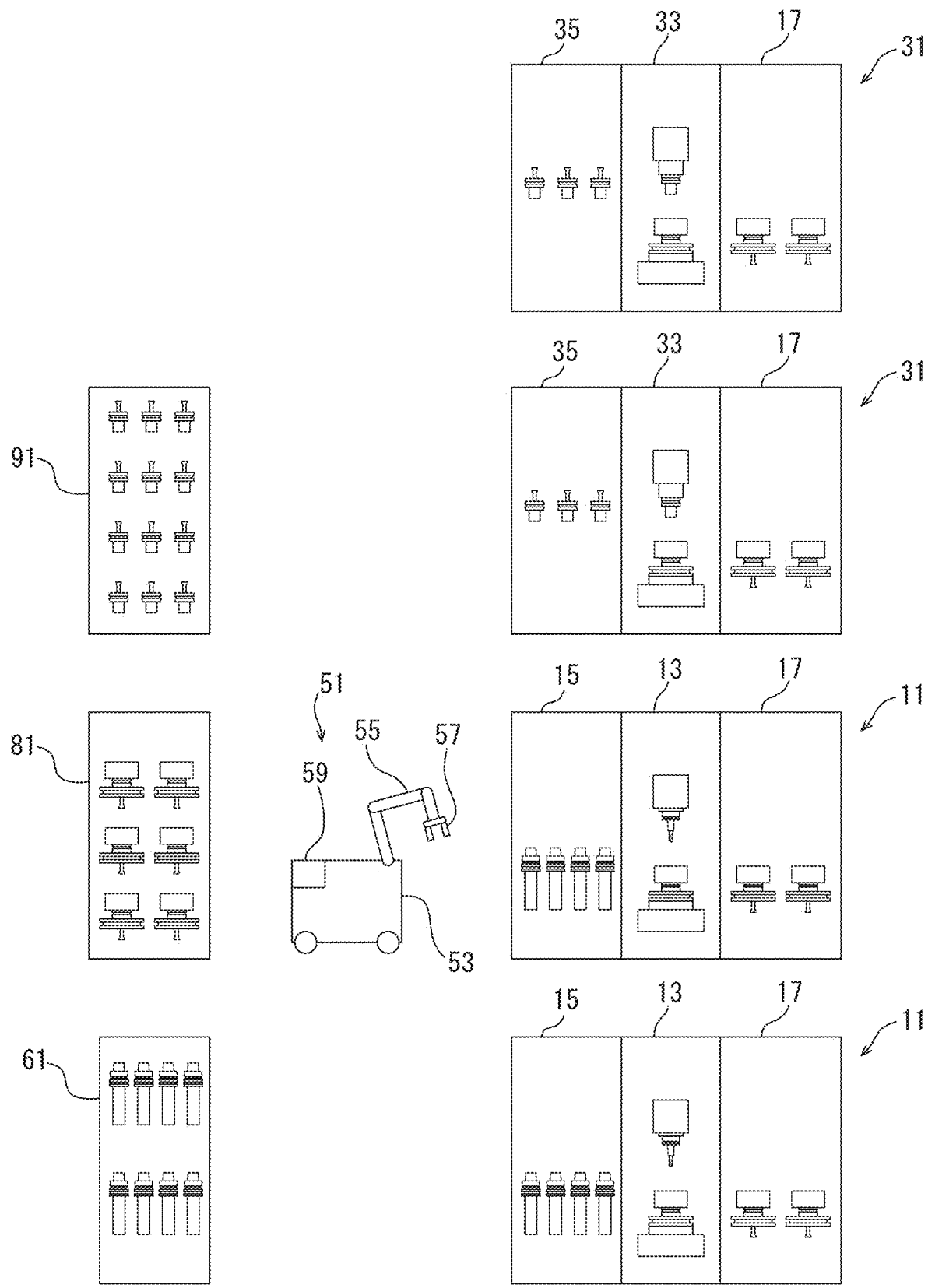
FIG. 1 is a schematic view showing an embodiment of a machine tool system according to the present invention.

An embodiment of the present invention is shown in FIG. 1. The present invention is directed to a machine tool system which transports tools T, workpieces W, and electrodes 95 between respective storages in which the tools T and workpieces W are accommodated and a plurality of machine tools 11 and electrical discharge machining devices 31 using a self-propelled robot 51.

Figure 2:
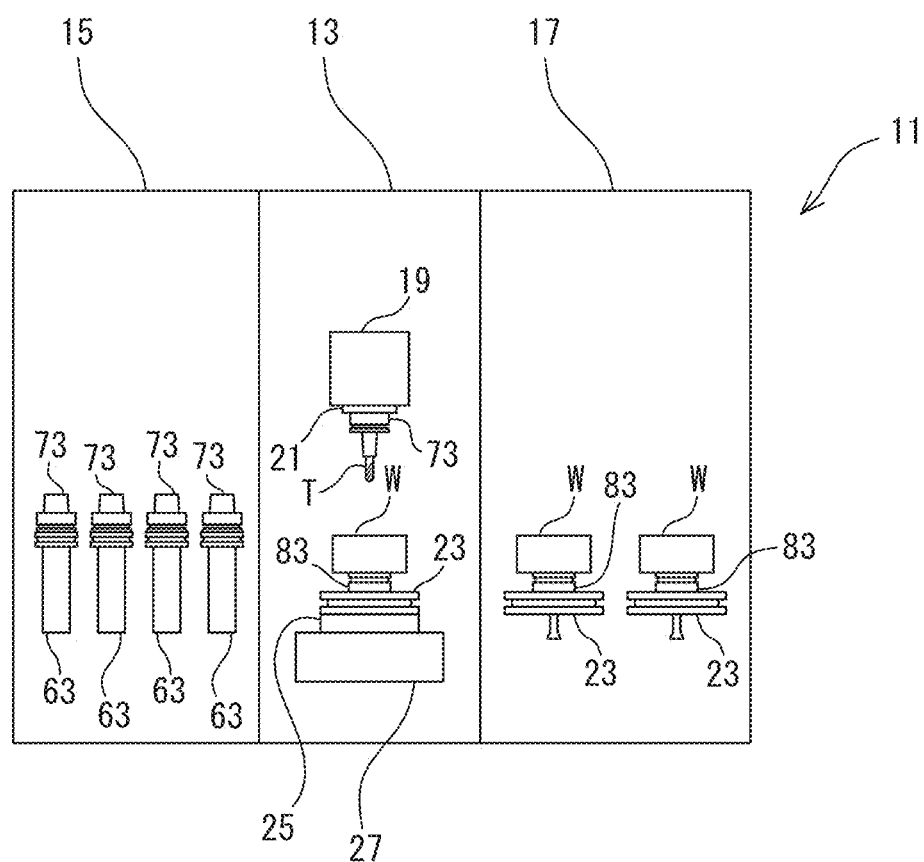
FIG. 2 is a schematic view showing a machine tool according to the present invention.

The machine tool 11 shown in FIG. 2 is a machining center in which a rotating tool T and a workpiece W are moved relative to each other with a feed axis to cut the workpiece W with the tool T. The machine tool 11 is constituted by a machining chamber 13, a tool accommodation device 15, and a pallet exchange device 17. The machine tool 11 includes a spindle 21 which holds the tool T. The spindle 21 is rotatably supported in a spindle head 19. The spindle head 19 can be moved in the X direction and Z direction by feed axes. The machine tool 11 includes a table 27 equipped with a chuck 25 which holds a pallet 23 on which a workpiece W is mounted. The table 27 can be moved in the Y direction by a feed axis. The tool T and the workpiece W are moved relative to each other by moving the spindle head 19 and the table 27 relative to each other. In the machine tool 11, in order to automatically exchange the tool T held in the spindle 21, each tool T, assembled with a tool holder 73, is stored in the tool accommodation device 15. The tool accommodation device 15 stores a plurality of tool holders 73, and the tool T is exchanged when an unillustrated tool exchange device replaces the tool holder held by the spindle 21 with a tool holder 73 in the tool accommodation device 15. The pallet exchange device 17 exchanges the pallet 23 held on the table 27 with another pallet 23.

The electrical discharge machining device 31 is a die-sinking electrical discharge machining device which has a spindle which holds an electrode 95 and a table on which a workpiece W is mounted and which performs electrical discharge machining by moving the spindle and the table relative to each other with a feed axis, and applying a voltage between the electrode and the workpiece to generate an electrical discharge. The electrical discharge machining device 31 is constituted by a machining chamber 33, an electrode accommodation device 35, and a pallet exchange device 17. Since the electrical discharge machining device 31 automatically exchanges the electrode held in the spindle, each electrode 95 is stored in the electrode accommodation device 35 assembled with an electrode holder 93. The electrode accommodation device 35 exchanges electrodes by replacing the electrode holder 93 held in the spindle with an electrode holder 93 in the electrode accommodation device 35 by an unillustrated electrode exchange device. Furthermore, like the machine tool 11, a pallet exchange device 17 is provided to exchange a pallet 23 held on the table and another pallet 23.

The self-propelled robot 51 comprises an automated guided vehicle 53, and a manipulator 55 having three or more degrees of freedom mounted on the automated guided vehicle 53. A hand 57 is included on the tip of the manipulator 55. A carriage 59 for temporary arrangement of articles to be transported is provided on an upper part of the automated guided vehicle 53 of the self-propelled robot 51.

The hand 57 comprises two fingers, and an engagement portion for engaging with the shape of the fingers is formed in the object to be transported. In the present invention, the engagement portion is in the form of a groove formed in the outer circumference of the object to be carried. The fingers of the hand 57 are inserted into the groove-shaped engagement portion, and the two fingers are closed inwardly to grip the object to be transported. The fingers of the hand 57 match the groove shape, whereby the object can be reliably held without dropping.

A tool T used in the machine tool 11 of the present invention is attached to a tool holder 73 having a predetermined shape. The tool holder 73 is constituted by a taper part 75, a flange part 77, and a tip 79. The shapes of the flange part 77 and the taper part 75 of the tool holder 73 are defined by standards. The taper part 75 of the tool holder 73 is used when the spindle 21 grips the tool holder 73. A groove is formed in the flange part 77 of the tool holder 73, and this groove is used when the tool holders 73 of the spindle 21 and the tool accommodation device 15 are exchanged by the automatic tool exchange device of the machine tool.

Figure 3A:
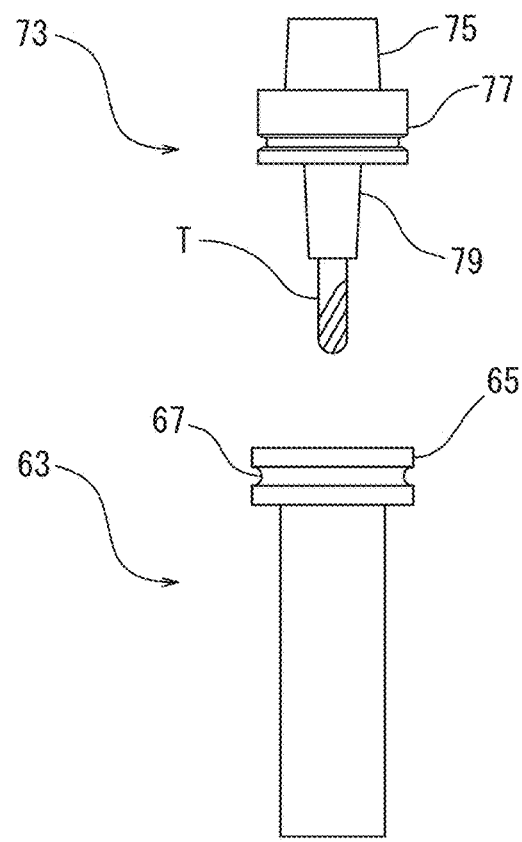
FIG. 3A is a view detailing a tool holder adapter according to the present invention.
Figure 3B:
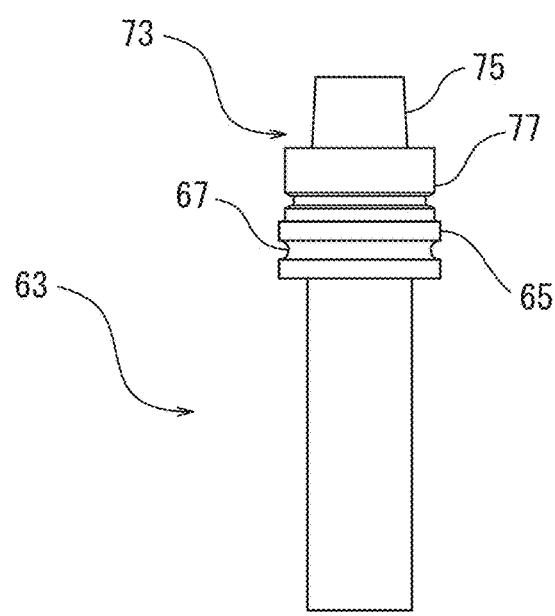
FIG. 3B is a view detailing the tool holder adapter according to the present invention.

The tool holder adapter 63 is a tube-like article, has a flange 65 in an upper part thereof, and a groove-like engagement part 67 which engages with the fingers of the hand 57 is formed in the flange 65. The tip side of the tool holder 73 can be inserted into the hole of the tube. FIG. 3A illustrates a state prior to insertion of the tool holder 73 into the tool holder adapter 63 and FIG. 3B illustrates a state in which the tool holder 73 has been inserted into the tool holder adapter 63. Since the tip of the tool holder 73 may have any of various shapes, the tip is essentially not suitable as a portion to be gripped. However, by inserting the tool holder 73 into the tool holder adapter 63 and gripping the tool holder adapter 63 with the hand 57, the tool holder 73 can be indirectly gripped.

A large number of reserve tool holders 73 are stored in the tool storage 61 inserted into tool holder adapters 63. The self-propelled robot 51 grips the flange 65 of a tool holder adapter 63 with the hand 57 and transfers a tool holder 73 along with the tool holder adapter 63 between the carriage of the self-propelled robot 51 and the tool storage 61.

The pallet 23 used in the machine tool 11 and the electrical discharge machining device 31 of the present invention will be described. A groove 88 is formed in the outer circumference of the pallet 23, and the groove 88 is used for a pallet exchange device to grip the pallet 23 when a pallet 23 on the table is exchanged. Since a workpiece W is loaded onto the pallet 23, the outer circumference of the pallet 23 is made larger as compared to the tool holder 73. Since the outer circumference of the pallet 23 is large, it cannot be gripped with a hand 57 having the same size as the hand 57 of the self-propelled robot 51 used to transport the tool holder 73. Thus, conventionally, it was necessary to prepare self-propelled robots having different hand sizes for the transportation of the tool holder 73 and the workpiece W, or to perform an operation to exchange the hand itself.

Figure 4:
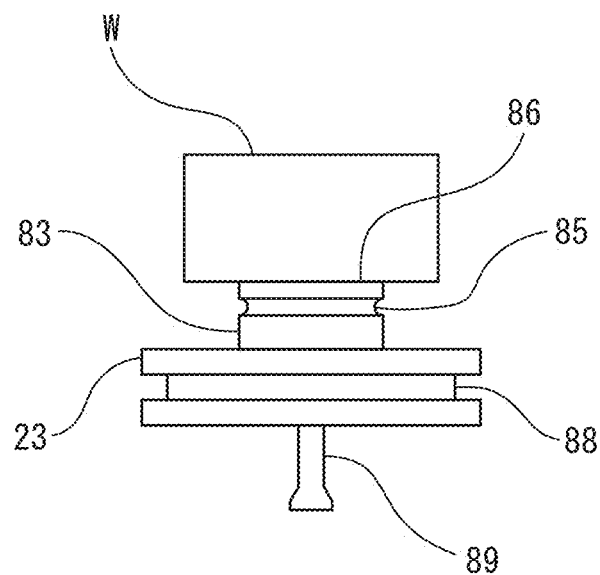
FIG. 4 is a view detailing a workpiece adapter according to the present invention.

A workpiece adapter 83 will be described with reference to FIG. 4. The workpiece adapter 83 is formed on top of the pallet 23. A pull stud 89 which is used for connection with a chuck 25 is formed below the pallet 23. The upper surface of the workpiece adapter 83 serves as an attachment part 86 for attachment of the workpiece W. The workpiece adapter 83 is formed smaller than the outer shape of the pallet 23. A groove-like engagement part 85 for engaging with the fingers of the hand 57 is formed in the outer circumference of the workpiece adapter 83. As a result, gripping can be performed with the hand 57 of the self-propelled robot 51 without exchanging the hand 57.

In the workpiece storage 81, each unmachined workpiece W is affixed to a pallet 23 via a workpiece adapter 83. The self-propelled robot 51 can move a workpiece W along with a pallet 23 onto the carriage 59 of the self-propelled robot 51 by gripping the workpiece adapter 83 with the hand 57. Furthermore, after machining, the self-propelled robot 51 collects the machined workpiece W along with the pallet 23 and the workpiece adapter 83 from the machine tool 11 or electrical discharge machining device 31, and transports them to the workpiece storage 81.

Figure 5:
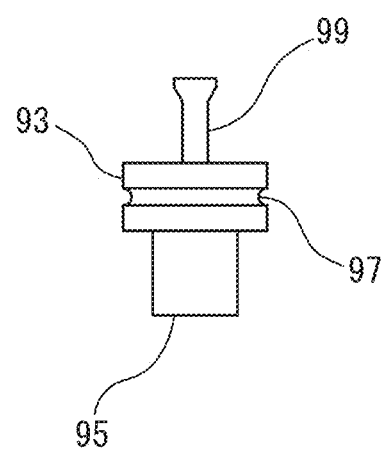
FIG. 5 is a view detailing an electrode adapter according to the present invention.

Next, an electrode holder 93 will be described with reference to FIG. 5. A groove-like engagement portion 97 which is used when an electrode exchange device holds the electrode holder 93 is formed in the outer circumference of the electrode holder 93. A pull stud 99 which is used for connection with the spindle is formed on the top of the electrode holder 93. This engagement portion 97 of the electrode holder 93 has the same shape as the engagement portion for the hand of the self-propelled robot 51. As a result, the electrode holder 93 can also be gripped with the hand 57 of the self-propelled robot 51. An electrode holder 93 can be transported by the self-propelled robot 51 between the electrode accommodation device 35 of the electrical discharge machining device 31 and an electrode storage 91.

A large number of reserve electrode holders 93 are stored in the electrode storage 91. The self-propelled robot 51 directly grips the engagement portion 97 of the electrode holder 93 with the hand 57, and moves the electrode holder 93 between the carriage 59 of the self-propelled robot 51 and the electrode storage 91.

Due to the above structure, the self-propelled robot 51, which receives a transport command from a central controller which manages the entire machine tool system, transports workpieces W between the machine tool 11 or electrical discharge machining device 31 and the workpiece storage 81. The self-propelled robot 51 grips the workpiece adapter 83 with the hand 57, whereby the workpiece W can be moved along with the pallet 23 onto the carriage 59 of the self-propelled robot 51. Thereafter, the self-propelled robot 51 travels to the vicinity of the destination pallet exchange device 17, grips the workpiece adapter 83 with the hand 57, and places the workpiece W on the carriage 59 at the destination.

Regarding the transportation of a tool holder 73, like the case of the workpiece W, the self-propelled robot 51, which receives a transportation command from the central controller, transports the tool holder 73 between the machine tool 11 and the tool storage 61. The self-propelled robot 51 grips the tool holder adapter 63 with the hand 57, whereby the tool holder 73 is moved along with the tool holder adapter 63 onto the carriage 59 of the self-propelled robot 51. Thereafter, the self-propelled robot 51 travels to the vicinity of the tool accommodation device 15 of the destination machine tool, grips the tool holder adapter 63 with the hand 57, and places the tool holder 73 on the carriage 59 along with the tool holder adapter 63 at the destination.

The machine tool 11 and the electrical discharge machining device 31 perform machining while automatically exchanging the tool holder 73, pallet 23, and electrode holder 93 on the spindle or table of the machine tool 11 or the electrical discharge machining device 31 with a tool holder 73, pallet 23, or electrode holder 93 in the tool accommodation device 15, pallet exchange device 17, or electrode accommodation device 35 in accordance with independently executed commands described in a machining program.

According to the present invention, there is proposed a machine tool system which can perform transportation between the machine tool 11 and the electrical discharge machining device 31 and the tool storage 61, the workpiece storage 81, and the electrode storage 91 with a single self-propelled robot 51 having a single type of hand 57, and which can adapt without performing an operation to exchange the hand. The present invention is effective even when there is a plurality of self-propelled robots 51. For example, when many tool holders 73 are transported, a greater number of self-propelled robots 51 can be assigned to the transportation of tool holders 73, and if the transportation of workpieces W increases, the number of self-propelled robots 51 assigned to the transportation of workpieces W can be easily increased, whereby operations with less waste can be carried out.

Furthermore, since engagement portions for the hand of the self-propelled robot are added to the tool holder adapter 63 and the workpiece adapter 83 in the present invention, there is no need to change the shapes of the portions of the tool holder and pallet for engagement with the tool exchange device and pallet exchange device of the machine tool 11 or the shape of the pallet. Thus, existing tool holders and pallets, as well as tool exchange devices and pallet exchange devices for gripping them can be used as they are. Therefore, it is easy to incorporate an existing machine tool into the machine tool system of the present invention. Since a mechanism for exchanging the hand 51 is not required, the weight of the manipulator 55 of the self-propelled robot 51 is reduced, whereby the speed at which the hand 51 operates can be increased.

REFERENCE SIGNS LIST

11 Machine Tool
13 Machining Chamber
15 Tool Accommodation Device
17 Pallet Exchange Device
19 Spindle Head
21 Spindle
23 Pallet
25 Chuck
27 Table
31 Electrical Discharge Machining Device
33 Machining Chamber
35 Electrode Accommodation Device
51 Self-Propelled Robot
53 Automated Guided Vehicle
55 Manipulator
57 Hand
59 Carriage
61 Tool Storage
63 Tool Holder Adapter
65 Flange
67 Engagement Part
73 Tool Holder
75 Taper Part
77 Flange Part
79 Tip
81 Workpiece Storage
83 Workpiece Adapter
85 Engagement Part
86 Attachment Part
88 Groove
89 Pull Stud
91 Electrode Storage
93 Electrode Holder
95 Electrode
97 Engagement Portion
99 Pull Stud

The invention claimed is:

1. A machine tool system for transporting tools and workpieces to a plurality of machine tools, the system comprising:

a first tool holder for holding a first tool of said tools, the first tool having a longitudinal axis, a self-propelled robot having a hand for engagement with a predetermined shape, a first tool holder adapter having a hole for accommodating therein the first tool and a tip of the first tool holder, and the first tool holder adapter further having a flange, said flange having a circumferential groove formed therein for engagement with the hand, and a tool storage for storing a plurality of tool holder adapters for storing tool holders including the first tool holder adapter and the first tool holder, wherein an axis, which extends perpendicular to the longitudinal axis of the tool, extends through the first tool and the first tool holder adapter when the first tool and the tip of the first tool holder are accommodated within the first tool holder adapter, and when the first tool holder is transported from the tool storage to a first machine tool of the plurality of machine tools, the self-propelled robot transports the first tool by gripping with the hand thereof the circumferential groove of the flange of the first tool holder adapter.

2. The machine tool system according to claim 1, wherein at least one of the plurality of machine tools has a pallet chuck which engages with a pallet, the system further comprises:
  the pallet which engages with the pallet chuck,
  a first workpiece adapter including an attachment part to which a first workpiece of the workpieces can be attached and an engagement part which engages with the hand and which is formed between the pallet and the attachment part, and
  a workpiece storage in which a plurality of pallets are stored, each of the plurality of pallets being stored in a state in which the attachment part thereof has a respective workpiece of the workpieces attached thereto, and when the first workpiece is transported from the workpiece storage to the first machine tool, the self-propelled robot transports the first workpiece by gripping the first workpiece adapter.

3. The machine tool system according to claim 2, wherein at least one of the plurality of machine tools has an electrode holder chuck which engages with a first electrode holder, the system further comprises an electrode storage in which a plurality of electrode holders which hold electrodes are stored including the first electrode holder and a first electrode that is held by the first electrode holder, and an engagement part for engaging with the hand is formed in the first electrode holder, and when the first electrode is transported from the electrode storage to the at least one of the plurality of machine tools that has an electrode holder chuck, the self-propelled robot holds and transports the first electrode holder.

* * * * *